(12) United States Patent
Holladay et al.

(10) Patent No.: US 6,324,305 B1
(45) Date of Patent: Nov. 27, 2001

(54) METHOD AND APPARATUS FOR SEGMENTING A COMPOSITE IMAGE INTO MIXED RASTER CONTENT PLANES

(75) Inventors: Thomas M. Holladay, Webster; Robert R. Buckley, Rochester; R. Victor Klassen; Norman W. Zeck, both of Webster; Peter A. Crean, Penfield, all of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/218,643

(22) Filed: Dec. 22, 1998

(51) Int. Cl.⁷ .............. G06K 9/36; G06K 9/34; G06K 1/00; H04N 1/40
(52) U.S. Cl. ............ 382/239; 382/176; 358/1.15; 358/462
(58) Field of Search .................. 382/232, 239, 382/243, 246, 250, 173, 176; 358/1.15, 462

(56) References Cited

U.S. PATENT DOCUMENTS

| | | | |
|---|---|---|---|
| 5,060,980 | 10/1991 | Johnson et al. | 283/70 |
| 5,251,271 | 10/1993 | Fling | 382/44 |
| 5,303,313 | 4/1994 | Mark et al. | 382/56 |
| 5,432,870 | 7/1995 | Schwartz | 382/232 |
| 5,680,526 * | 10/1997 | Andresen et al. | 395/131 |
| 5,764,807 * | 6/1998 | Pearlman et al. | 382/240 |
| 5,778,092 | 7/1998 | MacLeod et al. | 382/176 |
| 5,784,175 | 7/1998 | Lee | 358/433 |
| 5,982,937 * | 11/1999 | Accad | 382/239 |

FOREIGN PATENT DOCUMENTS

| | | | |
|---|---|---|---|
| 0 691 784 A2 | 1/1996 | (EP) | H04N/1/41 |
| 0 708 552 A2 | 4/1996 | (EP) | H04N/1/41 |
| 0 774 858 A2 | 5/1997 | (EP) | H04N/1/41 |

OTHER PUBLICATIONS

"Object–Based Layer–Structure Very Low Bit Rate Video Coding," Huang et al. International Conference on Image Processing 1996 Proceddings, vol. 1, 1996, pp. 649–652.*

* cited by examiner

Primary Examiner—Wenpeng Chen
(74) Attorney, Agent, or Firm—Mark Costello; Mark Z. Dudley

(57) ABSTRACT

An improved technique for compressing a color or gray scale pixel map representing a document using an MRC format including a method of segmenting an original pixel map into two planes, and then compressing the data or each plane in an efficient manner. The image is segmented such that pixels that compress well under a lossy compression technique are placed on one plane and pixels that must be compressed losslessly are placed on another plane. Lossy compression is then applied to the lossy pixel plane while lossless compression is applied to the lossless pixel plane.

25 Claims, 5 Drawing Sheets

METHOD AND APPARATUS FOR SEGMENTING A COMPOSITE IMAGE INTO MIXED RASTER CONTENT PLANES

FIELD OF THE INVENTION

This invention relates generally to image processing and, more particularly, to techniques for compressing the digital representation of a color document.

BACKGROUND OF THE INVENTION

Documents scanned at high resolutions require very large amounts of storage space. Instead of being stored as is, the data is typically subjected to some form of data compression in order to reduce its volume, and thereby avoid the high costs associated with storing it. "Lossless" compression methods such as Lempel-Ziv (LZ) do not perform particularly well on scanned pixel maps. While "lossy" methods such as JPEG work fairly well on continuous-tone pixel maps, they do not work particularly well on the parts of the page containing text. To optimize image data compression, techniques, which can recognize the type of data being compressed, are needed.

One approach to satisfy the compression needs of differing types of data has been to use the Mixed Raster Content (MRC) format to describe the image. The image—a composite image having text intermingled with color or gray scale information—is segmented into two or more planes, generally referred to as the upper and lower plane, and a selector plane is generated to indicate, for each pixel, which of the image planes contains the actual image data that should be used to reconstruct the final output image. Segmenting the planes in this manner can improve the compression of the image because the data can be arranged such that the planes are smoother and more compressible than the original image. Segmentation also allows different compression methods to be applied to the different planes. Thus, a compression technique that is most appropriate for the data residing thereon can be applied to each plane.

An approach such as this is discussed in U.S. Pat. No. 5,778,092 to MacLeod et al. issued Jul. 7, 1998, the contents of which are hereby incorporated by reference. U.S. Pat. No. 5,778,092 discloses a technique for compressing a color or gray scale pixel map that represents a document. The pixel map is decomposed into a three-plane representation—a reduced-resolution foreground plane, a reduced-resolution background plane, and a high-resolution binary selector plane. The foreground plane contains the color or gray scale information of foreground items such as text. The background plane contains the color or gray scale information for the "background" of the page and the continuous tone pictures that are contained on the page. The selector plane stores information for selecting from either the foreground plane or background plane during decompression.

When an MRC technique is used to compress a color digital image, the upper and lower planes are typically compressed using both lossy and lossless techniques, with the lossy compression being directed to entire pixel blocks and lossless compression applied to individual pixels. In other words, for each plane every pixel block is either subjected to lossless compression (which is appropriate for smooth, low-noise data) or to lossy compression (more appropriate for scanned pictorial data), possibly followed by overriding of certain designated pixels with values that have been obtained using a lossless compression technique.

While MRC has shown to be successful at separately processing data once it has been placed on these separate planes, subjecting an entire block of pixels to lossy compression, then applying a lossless technique to some pixels in the block and replacing the appropriate values is very inefficient, and often causes an increase in the number of bits that are required to encode the entire image, thereby lengthening the amount of time in which full processing of the image will take place. This results in inconveniences to the user of a printer, fax machine, scanner or other device in which the technique has been incorporated. Processing images at low speed in printers and copiers results in reduced output speeds, which is undesirable and often unacceptable in today's office environment. In fax machines, image processing at slow speeds could require the addition of very large buffers and/or very fast modems in order to prevent the modem from disconnecting before the entire image is transmitted since the modem can remain idle for lengthy periods of time while waiting for image data to be processed. For this reason, it is advantageous to somehow reduce the amount of data residing on each plane prior to processing.

The present invention is directed to segmenting and then compressing color image data using the MRC format. The segmenting embodiments of the invention are directed to separating the original image data into two planes based upon the manner in which the data should subsequently be compressed. Compression embodiments are directed to compressing the data on the segmented planes using an appropriate technique. The compressed planes are then combined to produce the final output image. The compression technique will either have one selector plane for the entire image (image-wise segmentation), or one per separation (separation-wise segmentation).

The following disclosures may be relevant to aspects of the present invention:

U.S. Pat. No. 5,251,271 to Fling issued Oct. 5, 1993 discloses a method for registering digitized multi-plane color images. The method designates one plane as the reference plane and registers each of the other warped planes with the reference plane. Each plane comprises pixels representing luminosity values having scalar x and y coordinates representing positions in the horizontal and vertical directions, respectively, of the plane. The planes are divided into regions. Correlation values are calculated for regions within the divisional region of the reference plane with a plurality of regions offset from the corresponding warped divisional region. A warp error value is calculated for each pixel of each divisional region as a function of the scalar offset. The warp error values are interpolated and added to the current position of each pixel of the warped plane.

Separate processing of various types of data contained in a document is disclosed in U.S. Pat. No. 5,060,980 to Johnson et al. issued Oct. 29, 1991 which describes a "form" that includes user modifiable fields and an encoded description of the location, size, type, etc. of the fields to allow for direct programming of a form interpreter. Other information including the processing of the form, encoded data, etc. may be included in the encoded information. A system for creating forms carrying an encoded description of selected attributes of the fields includes means for selecting or creating fields and locating the fields on a form while generating, substantially simultaneously, the encoded description of the selected attributes. A form composer then allows merging of the form and its encoded description for printing or electronic transmission. A system for reading such forms includes a scanner, decoding device, and processor. By reading such forms, data may be entered into or recalled from a data processing system, or a form interpreter may be programmed, locally or remotely, for subsequent handling of forms.

U.S. Pat. No. 5,784,175 to Lee, issued Jul. 21, 1998 discloses a video compression encoder process for compressing digitized video signals representing display motion in video sequences of multiple image frames. The encoder process utilizes object-based video compression to improve the accuracy and versatility of encoding interframe motion and intraframe image features. Video information is compressed relative to objects of arbitrary configurations, rather than fixed, regular arrays of pixels as in conventional video compression methods. This reduces the error components and thereby improves the compression efficiency and accuracy. As another benefit, object-based video compression of this invention provides interactive video editing capabilities for processing compressed video information.

U.S. Pat. No. 5,303,313 to Mark et al. issued Apr. 12, 1994 describes image compression based on symbol matching. An image is "pre-compressed" prior to symbol matching using run-length encoding. Symbols are then extracted from the run-length representation. A voting scheme is used in conjunction with a plurality of similarity tests to improve symbol-matching accuracy. A template composition scheme wherein the template may be modified based on symbol matches is also disclosed.

U.S. Pat. No. 5,432,870 to Schwartz issued Jul. 11, 1995 discloses a method and apparatus for compressing and decompressing images of documents. More specifically, a method and apparatus for compressing images having a binary extractor, a binary compressor and a JPEG compressor is disclosed. The binary extractor produces a binary image representing an estimate of the binary information in the original image. The binary compressor compresses the binary image. The binary image is also subtracted from the original image to produce a difference image representing the continuous-tone information in the original image. The difference image is then compressed using the JPEG compressor. In this manner, the present invention compresses a document image without having to perform segmentation on the image.

Pending U.S. patent application (Ser. No. 09/203,870, filed Dec. 21, 1988) by Fan at al. entitled "Method and Apparatus for Segmenting Data to Create Mixed Raster Content Planes" and assigned to the assignee of the present invention discloses a technique for compressing a color or gray scale pixel map representing a document using an MRC format that includes segmenting an original pixel map into two planes, and then compressing the data or each plane in an efficient manner. The image is segmented by separating the image into two portions at the edges. One plane contains image data for the dark sides of the edges, while image data for the bright sides of the edges and the smooth portions of the image are placed on the other plane. This results in improved image compression ratios and enhanced image quality.

Pending U.S. patent application (Ser. No. 09/206,487, filed Dec. 7, 1998) by DeQueiroz et al. entitled "Method and Apparatus for Pre-Processing Mixed Raster Content Planes to Improve the Quality of a Decompressed Image and Increase Document Compression Ratios" and assigned to the assignee of the present invention discloses a technique for processing a color or gray scale pixel map representing a document is disclosed. The pixel map is decomposed into a three-plane representation, a reduced-resolution "upper" plane, a reduced-resolution "lower" plane, and a high-resolution binary selector plane. The "upper" and "lower" planes contain the color or gray scale for the page as well as the continuous tone pictures that are contained on the page. The selector plane stores information for selecting from either the foreground plane or background plane during decompression. Information contained in the selector plane is first used to pre-process the upper and lower planes to reduce the amount of data on each of the other two planes that will be subjected to further processing. Each of the pre-processed planes is compressed using a compression technique optimal for the type of data that resides upon it.

Pending U.S. patent application (Ser. No. 09/206,488, filed Dec. 7, 1998) by DeQueiroz et al. entitled "Iterative Smoothing Technique for Pre-Processing Mixed Raster Content Planes to Improve the Quality of a Decompressed Image and Increase Document Compression Ratios" and assigned to the assignee of the present invention discloses a method and apparatus for compressing a mixed raster content image that represents a color or gray scale a document is disclosed. The pixel map is decomposed into a three-plane representation- a reduced-resolution "upper" plane, a reduced-resolution "lower" plane, and a high-resolution binary selector plane.

An iterative smoothing technique is then used to pre-process the upper and lower planes using the information contained in the selector plane, thereby reducing the amount of data that will be subjected to further processing.

All of the references cited herein are incorporated by reference for their teachings.

Accordingly, although known apparatus and processes are suitable for their intended purposes, a need remains for a method and apparatus that can efficiently process digital image data by separately compressing the various portions of a composite image.

SUMMARY OF THE INVENTION

In one embodiment of the invention, a method of compressing a pixel map representation of a document is disclosed, the method including the steps of: creating a first image plane from the pixel map representation of a document, the first image plane containing color signals for a first subset of image data in the document; creating a second image plane from the pixel map representation of the document, the second image plane containing image signals for a second subset of image data in the document; creating a selector plane from the pixel map representation of the document, wherein the selector plane selects between the first subset signals and the second subset signals when decompressing the compressed pixel map representation of the document; and pre-processing the first image plane and the second image plane based upon data contained in the selector map.

In another embodiment of the invention an apparatus for processing pixel map representations of documents is disclosed, including: means for creating a first image plane from the pixel map representation of a document, the first image plane containing color signals for a first subset of image data in the document; means for creating a second image plane from the pixel map representation of the document, the second image plane containing image signals for a second subset of image data in the document; means for creating a selector plane from the pixel map representation of the document, wherein the selector plane selects between the first subset signals and the second subset signals when decompressing the compressed pixel map representation of the document; and means for pre-processing the first image plane and the second image plane based upon data contained in the selector map.

In yet another embodiment of the invention, a program storage device tangibly embodying a program of instructions executable by a machine to perform method steps for compressing a document image is disclosed, wherein the method steps include: creating a first image plane from the pixel map representation of a document, the first image plane containing color signals for a first subset of image data in the document; creating a second image plane from the pixel map representation of the document, the second image plane containing image signals for a second subset of image data in the document; creating a selector plane from the pixel map representation of the document, wherein the selector plane selects between the first subset signals and the second subset signals when decompressing the compressed pixel map representation of the document; and pre-processing the first image plane and the second image plane based upon data contained in the selector map.

DESCRIPTION OF THE INVENTION

Figure 1:
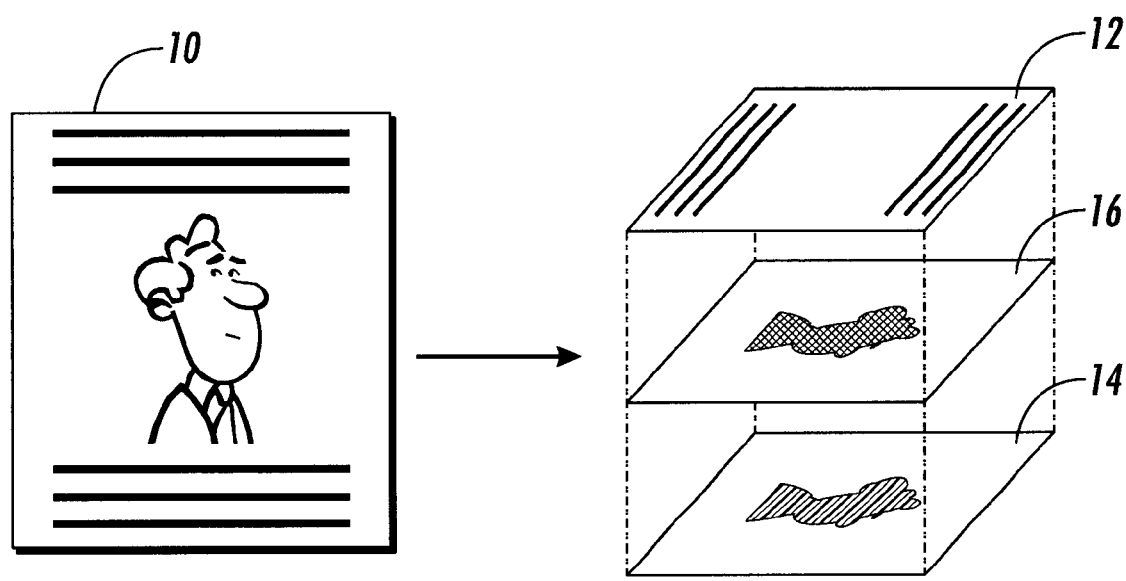
FIG. 1 illustrating an example of the manner in which a composite image may be decomposed into three MRC image planes.

The present invention is directed to a method and apparatus for separately processing the various types of data contained in a composite image. While the invention will described in a Mixed Raster Content (MRC) technique, those skilled in the art will recognize that it may be adapted for use with other methods and apparatus' and the invention is therefore, not limited to this description. The technique described herein is suitable for use in various devices required for storing or transmitting color documents such as facsimile devices, image storage devices and the like. While processing of color documents is preferred, it should be noted that similar image processing concepts apply to gray-scale black and white documents and as a result, those portions of the invention that are described with reference to color documents may be similarly applied to gray scale documents.

Color images are typically described as being divided into "separations." Color output devices such as printers and computer monitors typically output data using only a few independent color sources. Colorants or color signals obtained from these sources are then blended together in appropriate ways in order to produce the full gamut of colors that may be represented using the device. In a device dependent printer color space, Cyan, Magenta, Yellow and black are the individual colorants that are most often used in color printers. These colorant separations are typically labeled C, M, Y and K. Many device-independent color spaces also exist, such as CIE L*a*b*, in which the separations are Lightness, labeled L*, relative amount of red vs. green, labeled a*, and relative amount of yellow vs. blue, labeled b*.

A pixel map is one in which each discrete location on the page contains a picture element or "pixel" that emits a light signal with a value that indicates the color or, in the case of gray scale documents, how light or dark the image is at that location. As those skilled in the art will appreciate, most pixel maps have values that are taken from a set of discrete integers. For example, in a pixel map for a color document, individual separations are often represented as digital values, often in the range 0 to 255, where 0 represents no colorant (i.e. when CMYK separations are used), or the lowest value in the range when luminance-chrominance separations are used.

In an L*a*b* luminance-chrominance color space a 0 L* value means that no light is present (i.e. the location is completely black), while a*=0 means no red or green is present and b*=0 means that the spot is neither blue nor yellow. Both a*=0 and b*=0 means that the spot is gray, (somewhere between black and white). When represented in an integer space, L*, a*, and b* are typically scaled and translated to fit the range of representable values. In this case a*=b*=0 is actually represented with these values at the midpoint of their ranges, while a*=0 is used to represent green, and b*=0 is used to represent blue.

Consequently 255 represents the maximum amount of colorant (for CMYK) or the highest value in the range (maximum light/white, red and yellow respectively for L*a*b*). In a gray-scale pixel map this typically translates to pixel values which range from 0, for black, to 255, for the whitest tone possible. The pixel maps of concern in the currently preferred embodiment of the present invention are representations of rasterized or "RIPped" images. That is, images which are created using a Raster Image Processor (RIP) to convert an electronic document, typically represented by a page description language such as PostScript, into a raster image. The present invention may also apply to representations of "scanned" images—images that are created by digitizing light reflected off of physical media using a digital scanner. The term bitmap is used to mean a binary pixel map in which pixels can take one of two values, 1 or 0.

Turning now to the drawings for a more detailed description of the MRC format, pixel map 10 representing a color or gray-scale document is preferably decomposed into a three plane page format as indicated in FIG. 1. The document format is typically comprised of an upper plane 12, a lower plane 14, and a selector plane 16. Upper plane 12 and lower plane 14 contain pixels that describe the original image data. Pixels in the original image are separated based upon pre-defined criteria such that some of them are placed on upper plane 12 and the rest on lower plane 14. Selector plane 16 keeps track of every pixel in original pixel map 10 and maps all pixels to an exact spot on either upper plane 12 or lower plane 14.

The upper and lower planes are typically stored at the same bit depth and number of colors as the original pixel map 10, but possibly at reduced resolution. Selector plane 16 is created and stored as a bitmap. It is important to recognize that while the terms "upper" and "lower" are used to describe the planes on which data resides, it is not intended to limit the invention to any particular arrangement or configuration. Further, it is also possible to practice the invention with a configuration that results in both planes being placed such that neither is actually on the top or bottom (i.e. side by side).

After processing, all three planes are compressed using a method suitable for the type of data residing therein. For example, upper plane 12 and lower plane 14 may be compressed and stored using a lossy compression technique such as JPEG or a lossless compression technique such as Lempel-Ziv (i.e. gzip) or CCITT-G4. Selector plane 16 may be compressed and stored using a lossless compression format. It would be apparent to one of skill in the art to compress and store the planes using other formats that are suitable for the intended use of the color document. For example, in the Color Facsimile arena, group 4 (MMR) would preferably be used for selector plane 16, since the particular compression format used must be one of the approved formats (MMR, MR, MH, JPEG, JBIG, etc.) for facsimile data transmission.

Figure 2:
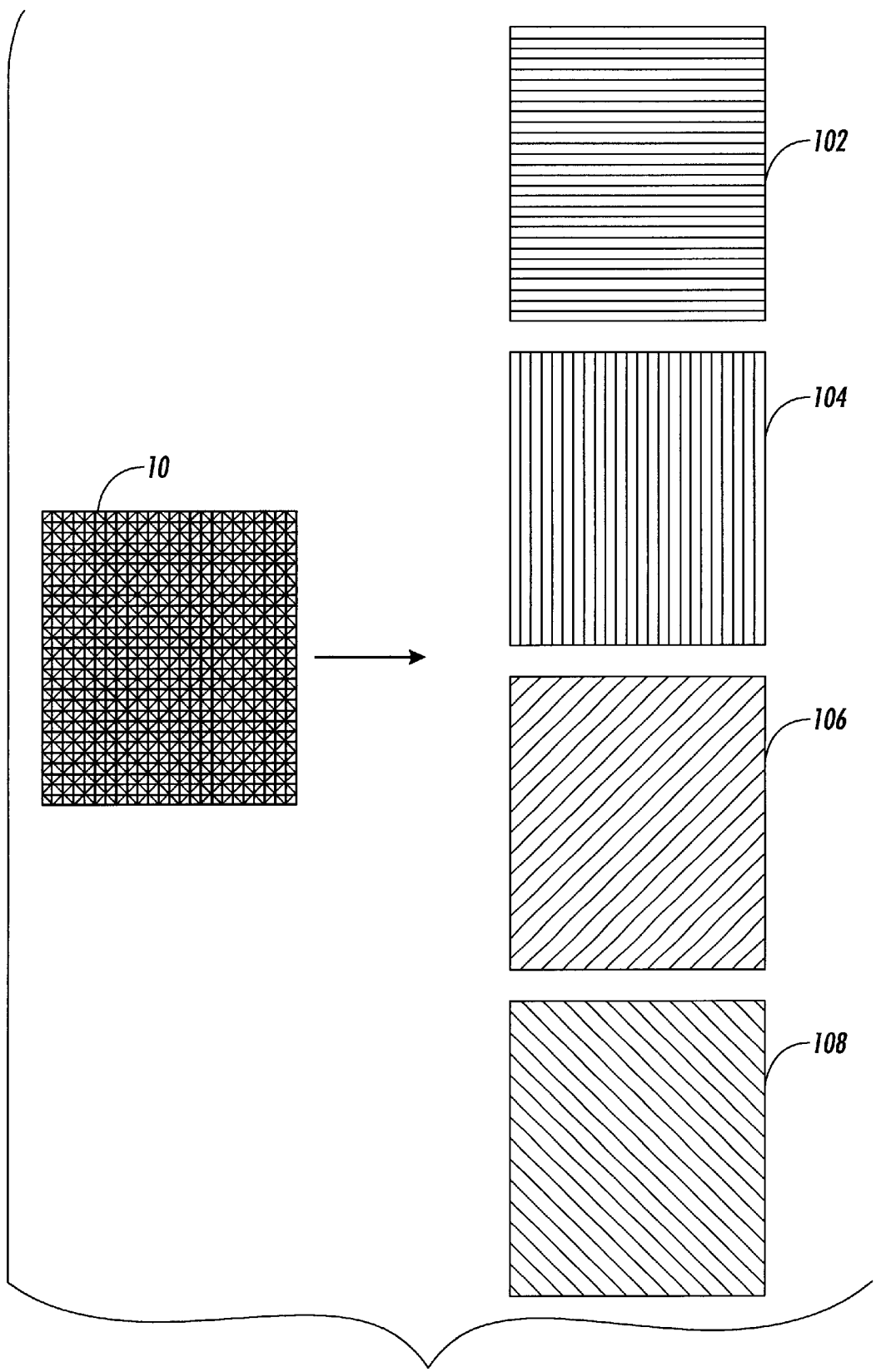
FIG. 2 contains a schematic illustration of a document with multiple superimposed separations and the manner in which the separations may be individually represented.

Turning now to FIG. 2, in the present invention digital image data is processed during a MRC technique such as described above. A color pixel map 10 is composed of multiple superimposed separations, where each individual separation distributes spectral power for a different wavelength range of light in the digital image. In one embodiment of the invention, these individual separations supply cyan 102, magenta 104, yellow 106 and black 108 colorants in a hardcopy output printing device. While the invention will hereinafter be described with reference to a scheme in which a printer provides these four colorants, those skilled in the art will recognize that other embodiments are possible. For example in another embodiment, individual separations emit red, green and blue colored light signals from phosphors in a video monitor. In still another embodiment, colorants are supplied in a hardcopy output printing device in a manner that is dependent upon signals that represent luminance and relative amounts of red vs. green and yellow vs. blue. Further, while the invention is described here using four colorant separations, those skilled in the art will recognize that the number of separations in which pixel map 10 will be divided may be varied, depending upon the constraints of the device. It is intended to embrace all such alternatives and others that would be recognized as equivalent or easily adaptable by those of ordinary skill in the art.

The present invention first requires dividing the superimposed separations into individual colorant separations 102, 104, 106 and 108. For purposes of illustration, horizontal, vertical, and diagonal lines represent the wavelength ranges (colors) for each separation. Since pixel map 10 preferably represents a scanned image, the image, and therefore each separation 102–108 contained therein, is composed of light intensity signals dispersed throughout the separation at discrete locations. Again, a light signal is emitted from each of these discrete locations, referred to as "picture elements," "pixels" or "pels," at an intensity level which indicates the magnitude of the light that being reflected from the original image at the corresponding location in that separation.

Figure 3:
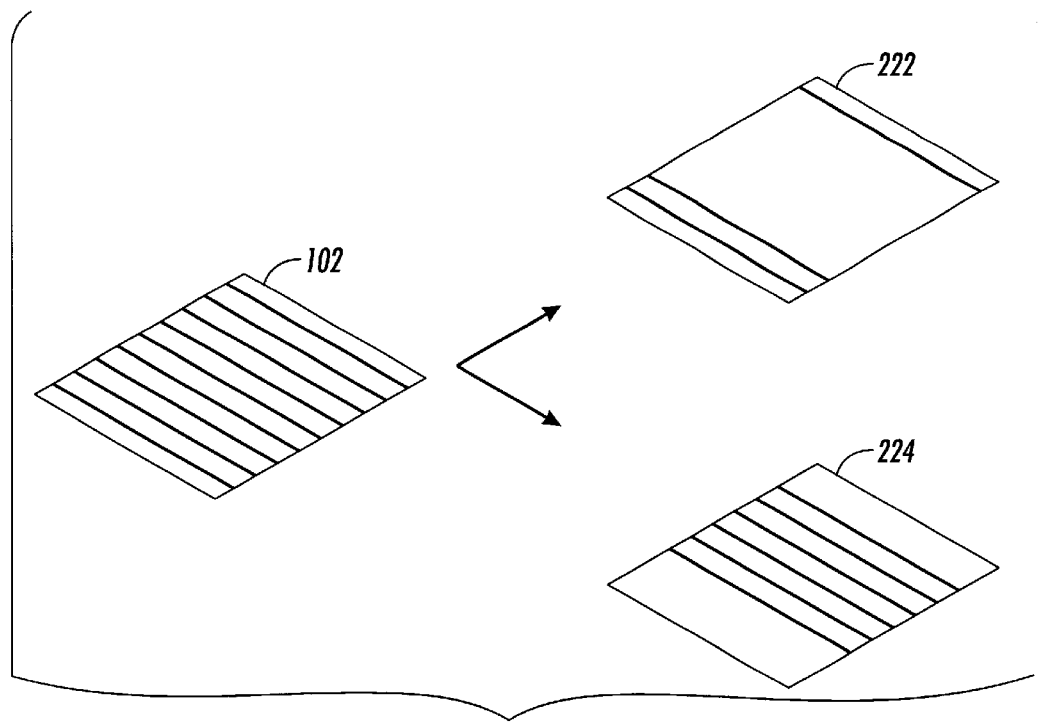
FIG. 3 depicts a single separation after image data thereon has been separated into two planes.

Referring now to FIG. 3, the invention will hereinafter be described with reference to processing cyan colorant separation 102. The process is identical for separations 104–108, and the description applies to those separations as well. In typical MRC fashion, separation 102 is partitioned into two planes. In the present invention, the criteria for deciding on which plane a pixel will be placed is the manner in which the pixel will best be compressed. Thus, separation 102 is divided into two planes-one lossless 222 and one lossy 224. More specifically, pixels in each separation are classified as either "lossy" or "lossless," based upon the type of compression that should be applied. Those signals that for a given level of quality will compress at a higher compression ratio losslessly are referred to as "lossless", while the remaining pixels are referred to as "lossy".

Generally speaking, lossy compression is a process that substantially reduces the volume of remaining data. Because of its ability to reduce data, it is desirable to apply a lossy compression technique whenever possible. Unfortunately producing such large amounts of data reduction also means that large amounts of imaging information will be lost. This often means that imaging accuracy will be significantly reduced. Pictorial data is one type of data that typically survives lossy compression well.

Text and large areas of a page covered with signals at a single light intensity are types of data that typically compress better losslessly. Areas containing strong edges—sharp discontinuities between regions of two constant colors—require very low compression ratios to provide acceptable image quality when compressed lossily. Areas containing only constant colors—no edges whatsoever—or only smooth gradations, compress very well using either technique, providing maximal compression ratios with no artifacts. The highest achievable compression ratios with lossless compression are generally higher than with lossy techniques, so in order to exploit the high compression available in these regions, lossless compression is preferred.

Lossy signal plane 222 is the location designated for pixels that have been classified as lossy. The remaining pixels are designated for lossless signal plane 224. Looking at separation 102, in other words lossy plane 222 will contain pixels for which it has been determined that lossy compression would be acceptable and desirable. The remaining pixels will be placed on lossless plane 224. Pixels that are placed on lossy plane 222 are placed in a location on plane 222 that directly corresponds to that in which they resided in separation 102. The remaining pixels are then placed on plane 224 in sequential order moving from right to left and from top to bottom.

Figure 4:
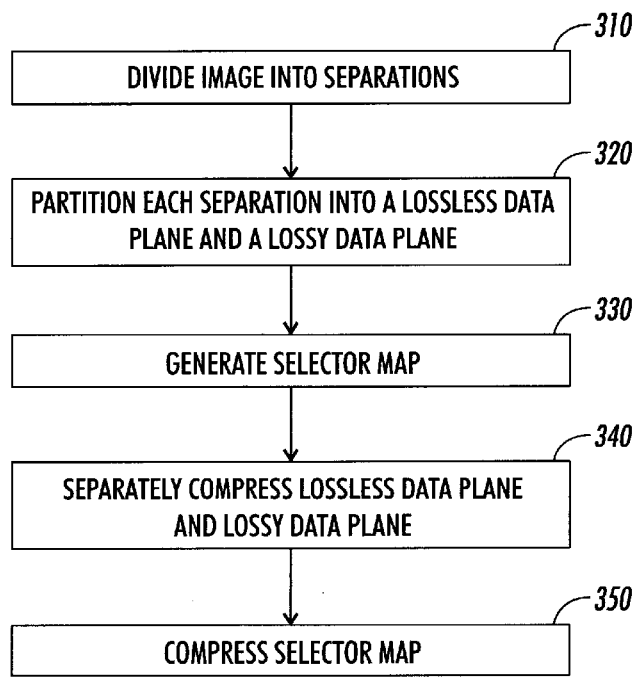
FIG. 4 contains a flow chart with a general description of image processing according to the present invention.

FIG. 4 contains a flow chart indicating the sequential order of the steps that are followed in one embodiment of the invention. The process begins by dividing original pixel map 10 into it individual separations 102–108, as indicated in step 310. Each separation is then partitioned into two planes as shown in step 320. As described above, these two planes are a plane 222 that will contain the pixels that are best compressed losslessly and a plane 224 that contains pixels that should be compressed lossily. A selector plane 16 is also generated as indicated in step 330, to keep track of the location of each pixel as original plane map 10 is partitioned. The planes are then compressed independently as indicated in steps 340 and 350.

Figure 5:
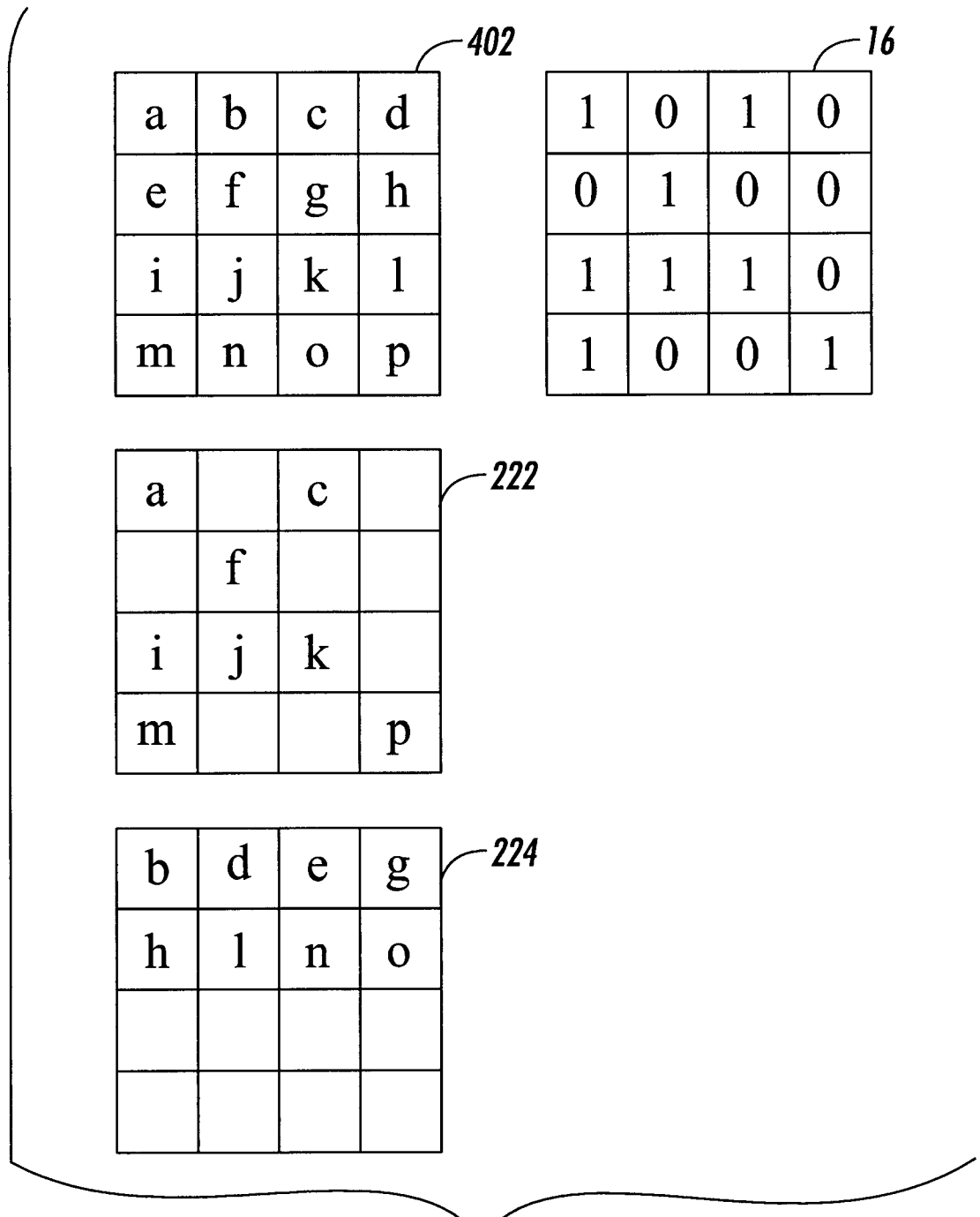
FIG. 5 illustrates a pixel map and the way in which data may be separated based upon constraints of subsequent compression.

Turning now to FIG. 5, assume that the contents of original pixel map 10 are as shown in block 402, and that image data indicated by characters a, c, f, i, j, k, m and p will adequately survive lossy compression. Under these circumstances, that data will be placed in lossy plane map 222 as shown in the illustration. The remaining characters b, d, e, g, h, l, n and o are then placed on plane 224.

Still referring to FIG. 5, partitioning of separation 102 is performed by generating a selector plane 16 which maps, for each location in the separation, whether the pixel residing there has been placed on lossy plane 222 or on lossless plane 224. Binary values are placed on selector plane 16 to provide this indication. As shown, 0's are placed in selector plane 16 in locations where pixels have been designated for lossless plane 224, while 1's are in the locations where signals have been placed on lossy plane 222. Once the planes have been created, they are compressed using an appropriate lossy or lossless compression technique. In the preferred embodiment of the invention, JPEG's ADCT compression will be applied to lossy plane 222, while freeware "gzip" will be applied to lossless plane 224. See G. Wallace "The JPEG still picture compression standard", *Communications of the ACM* 34 (4), pp.30–44, April 1991, the contents of which are hereby incorporated by reference, for a discussion of Adaptive Discrete Cosine Transform compression, also known as JPEG.

It should be noted that an indication of the type of data in a section of the image could be obtained by determining the number of consecutive pixels that have the same light intensity value. Short pixel runs—few consecutive pixels with the same light intensity—typically indicate that pictorial data is being processed. As stated earlier, pictorial data survives well when subjected to lossy compression. Thus, when only a few consecutive pixels have the same value or if the light intensity value is constantly changing, the pixels being processed are designated for lossy plane 222. This obviously means that long pixel runs—several consecutive pixels with the same light intensity value—remain and will be placed on lossless plane 224. Again, this is generally acceptable because long pixel runs generally compress well when compressed losslessly.

Figure 6:
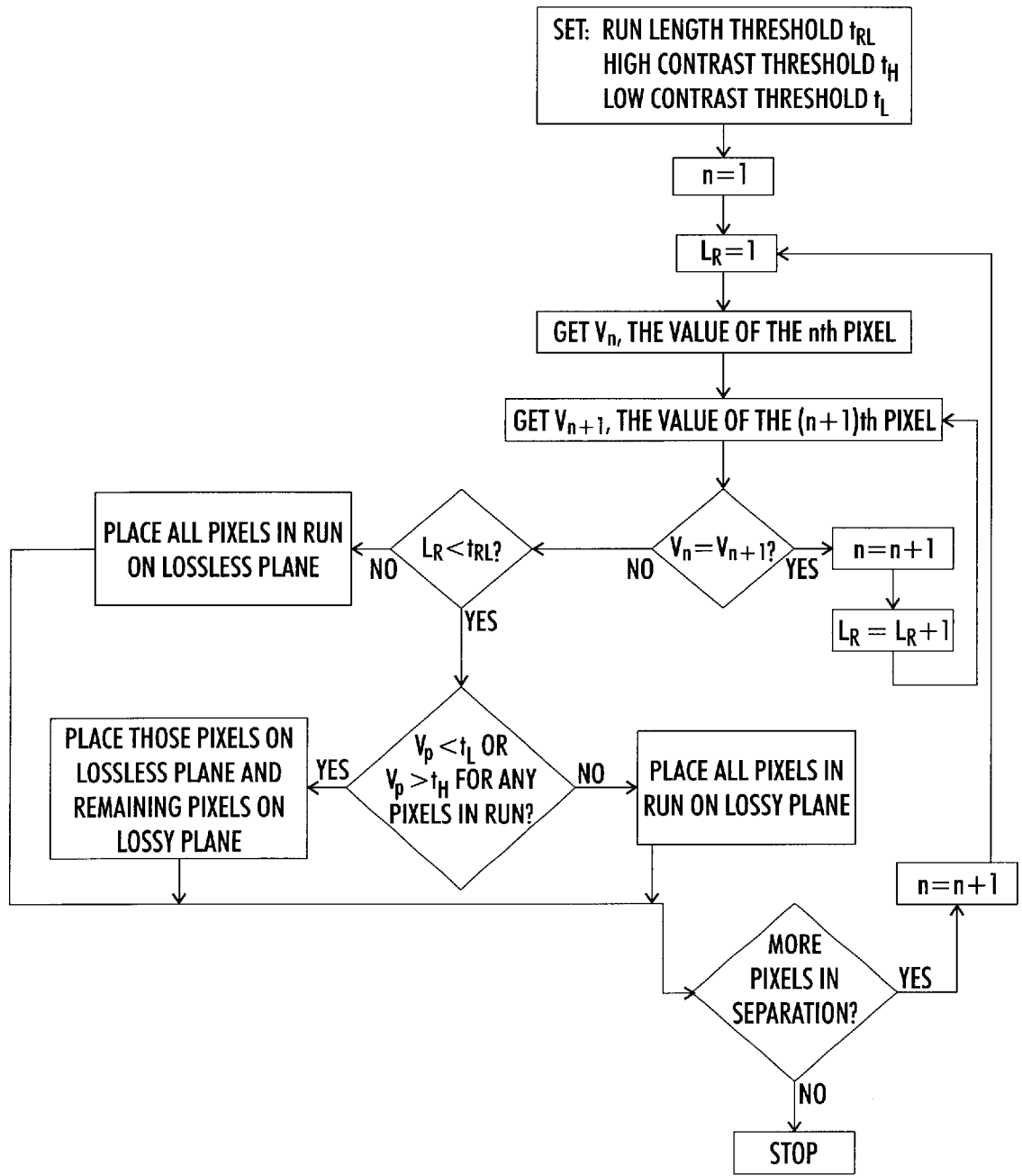
FIG. 6 contains a detailed illustration of one embodiment of segmentation according to the present invention.

Referring now to FIG. 6, a detailed description of the preferred embodiment of the segmentation portion of the present invention will now be provided. First, the number of consecutive pixels within the separation for which the light intensity values are equal must be. determined. Here it is sufficient that the light intensity values be nearly equal, that is equal to within some predetermined precision. It is known that high contrast data—data that has a light intensity value above a certain high threshold or below a certain low threshold—tends to exhibit artifacts when it is subjected to lossy compression (except in large regions of constant high or low value, where as previously indicated already indicated, lossless compression provides a higher compression ratio). When a short run has been identified the pixels in the run are designated in selector plane 16 as lossy pixels to be placed on lossy plane 222 as long as they are not high or low contrast pixels. The remaining pixels—high or low contrast or part of a long run—are classified as lossless pixels to be placed on lossless plane 224.

In one embodiment of the invention, data that is nearly constant for a run is modified so that the entire run is changed to the average value, and then compressed losslessly. In this way, scanned data of a constant value has scanning noise removed before the decision is made whether to compress lossily or losslessly. In long runs of data in which the light intensity values are slowly increasing or decreasing, similar smoothing may be performed, but only in such a way as to preserve the gradual increase or decrease in values.

As indicated in the illustration, pixels in the lossless plane are not arranged in the same manner as those in lossy plane 222. Pixels in lossless plane 224 are deposited onto the plane in serial fashion such that they are processed in the same order that they would be if they remained on separation plane 102.

A long pixel run is typically one that has at least somewhere between four and eight pixels in a row with the same light intensity value. In one embodiment of the invention, the Cyan separation of an image produced using color xerographic toner particles was compressed using a run length of 6 pixels, a high contrast value of 255 and a low contrast value of 0. These parameters resulted in a compression ratio of 10 to 1. Run length and contrast parameters can be varied in order to influence the amount of data that will be sent to lossy plane 222 instead of lossless plane 224.

Once segmentation has been completed, selector plane 16 is used to compress the data on both lossy plane 222 and lossless plane 224. Looking first at lossy plane 222, lossy data is typically block oriented. Generally speaking, lossy compression is performed by processing data in blocks— entire groups of pixels are processed simultaneously. Empty spaces on plane 222, which correspond to locations where pixels have not been retained, may be replaced by any value before compression occurs. The present invention takes advantage of the fact that non-retained values are not needed after compression by filling these spaces with pixel values that will result in high lossy compression efficiency.

Turning back to FIG. 5, in one embodiment of the invention, spaces on lossy plane 222 are filled in with pixel values that are equal to the previous neighbor in raster-scan order sequence. In another embodiment of the invention, these spaces are filled in by interpolating the pixels that were originally located in pixel map 10 in spots that correspond to the blank spaces using the DCT interpolation kernel. That is, each blank space is replaced with a pixel that has a value predicted by a DCT based interpolant. The lossy pixels in the block are fit with a number of terms in the expansion of the discrete cosine transform, the number being up to but not greater than the number of lossy pixels remaining. Given these terms, the interpolant is evaluated at the locations corresponding to the missing pixels. In this way, no new information is introduced into the block, which must be subsequently encoded using the DCT transform.

When the final image is reconstructed (as part of decompression), the image will be formed using the inverse discrete cosine transform (assuming JPEG compression). That is, the pixel at location (x, y) in the block will be computed as $$\frac{1}{4}\left[\sum_{u=0}^{7}\sum_{v=0}^{7} C(u)C(v)F(u, v) \times \cos\left(\frac{(2x+1)u\pi}{16}\right)\cos\left(\frac{(2y+1)v\pi}{16}\right)\right],$$

where $C(0)=1/\sqrt{2}$, $C(\xi>0)=1$, and $F(u,v)$ represents the transformed value at location (u,v). Each product $$B_{u,v}(x, y) = C(u)C(v)\cos\left(\frac{(2x+1)u\pi}{16}\right)\cos\left(\frac{(2y+1)v\pi}{16}\right)$$

is a single basis function, and the pixel is constructed as a sum of scaled basis functions, where the scales are given by the transformed values. In a block with no "missing" pixels, the transformed values are uniquely specified as the only values which when inverse transformed, will give the original values. These are readily computed using the forward discrete cosine transform, which is similar in form to the inverse discrete cosine transform. In a block with missing pixels, the 64 transformed values to be multiplied by the basis functions represent more degrees of freedom than there are constraints. Specifically, if even one value is missing, there are infinitely many possible combinations of transformed values that will, when inverse transformed, give the correct values at the remaining pixels, while each combination will give a different value at the missing pixel.

In large part JPEG compression derives its high compression ratio from the presence of small, insignificant values in the transformed block. In particular, high frequency values (i.e. values at locations for which u+v is large) are quantized in such a way that if they are small to begin with, they become 0 (this is the main origin of the loss in this form of lossy compression). One may think of the missing pixels as extra degrees of freedom, or one may think in terms of the extra degrees of freedom as being coefficients in the transformed domain. To improve compression, the objective is to use those extra degrees of freedom to maximize the compression ratio. This is achieved by arranging to have any extra transformed values 0.

Given a set of basis functions, $B=\{B_{u,v}(x,y)$, where $(u,v) \in S\}$, for some set S of pairs $(u,v)$, the problem is to find a set of weights, which when used to form a weighted sum of the basis functions, will give values for the pixels that remain on the plane. Then the missing pixels will be computed by substituting their locations into the same weighted sums. In this way when the transform is computed during the actual compression step, high order terms will be zero, and low order terms will, upon being inverse transformed, yield the original, values for the pixels that remain on the plane. The missing values will be wrong, but they will subsequently be replaced by values from the lossless channel.

To solve the problem of finding the set of weights, note that the locations of the remaining pixels forms a set P of ordered pairs $(x,y)$. Now number the elements of P in any convenient order, so that an element of P is simply $p_i$. Similarly number the ordered pairs in S, so that an element of S is $s_j$. If the basis functions corresponding to elements of S are evaluated at locations corresponding to elements of P, and indexed accordingly, then the value at point $p_I$ is given by:

$$\sum_j B_{u,v}(x,y)F(u,v) = \sum_j B_{s_j}(p_i)F(s_j) = \sum_j B_{ij}F_j$$

Numbering the original "non-missing" pixels according to the index of their location, we have the constraint $$f_i = \sum_j B_{ij}F_j \text{ or } f = BF,$$

with f, F vectors and B a matrix. This is a standard form, which may be solved exactly if the number of non-missing pixels is the same as the number of basis functions, or using standard least squares techniques otherwise.

One special case is worthy of note; if only the lowest order basis function is used in the least-squares solution, the solution will guarantee that the DC term is the same as the average of the non-missing pixels. A more efficient way of achieving the same end is to simply set all of the missing pixels to the average of the remaining pixels.

With continued reference to FIG. 5, the values retained for lossy plane 222 are those which were marked with 1's on selector plane 16. As shown in the illustration, pixels must be placed in the lossy plane in locations that directly correspond to locations in which they were located on original pixel map 10. This leaves empty spaces distributed throughout lossy plane 222 in the places that are marked by 0's on selector plane 16. The 0 values in selector plane 16 are useless as far as compression of lossy plane 222 is concerned since the losslessly compressed pixels on plane 224 will actually be placed in the final output image. As a result, these empty spaces can be filled with values that will best facilitate the lossy compression that will subsequently be applied.

Still referring to FIG. 5, processing of lossless plane 224 is similar in that values that have been marked with 0's are retained, since those are the ones designated as lossless pixels in selector plane 16. But unlike lossy data, lossless compression is generally performed on a pixel by pixel basis. Depending upon the constraints of the lossless compression method, the empty spaces on lossless plane 224 can also be filled with pixels that will enable maximum compression efficiency. In some cases, the empty spaces can simply be deleted. While lossless plane 224 is described as a "plane," it can actually be viewed as a continuous string of data.

In one embodiment of the invention, these empty spaces will be replaced with pixel values that are equal to the previous neighbor in the ordinary raster-scan order sequence. In another embodiment of the invention, each empty space will be filled with a pixel value equal to the most common pixel value that has been processed before it. If the empty spaces are deleted, their locations will be determined using selector plane 16. This means that pixels on lossless plane 224 do not have to be placed in locations that are in direct physical correspondence with those in original pixel map 10. The only criteria for locations in which pixels must be placed on lossless plane 224 is that they must be ordered such that they can be selected using selector plane 16 when necessary. Spaces filled on lossless plane 224 can be filled in with pixels that have values that have been manipulated or altered in the manner that will be most helpful during lossless compression.

As described above, segmentation and compression are performed separation by separation. In another embodiment of the invention, segmentation and compression may be performed on all separations of the entire image. Under these circumstances, the criteria for distinguishing long pixel runs from short pixel runs involve all separations together. All separations must be constant for some number of pixels in a row for a run to be long. In addition, whether a pixel is "high contrast" or "low contrasts" requires that all separations satisfy the same rule. Other than these requirements, the steps in performing the method remain as described above. In the case of L*a*b* or a similar -luminance-chrominance based color space, it is also possible to perform the segmentation based on only the L* (lightness) separation, and allow the a* and b* separations to be segmented in whatever way the L* dictates. Any errors caused by this approximation will come in the form of a* and b* data that is erroneously compressed lossily, which is unlikely to be seen, due to the eye's poor response to chromatic edges. Chrominance data that is losslessly compressed because of this approximation will not exhibit any errors, it will only not compress with quite as high a compression ration Turning back to FIG. 2, once each of the respective planes is generated, they are each compressed using a suitable compression technique. In the currently preferred embodiment, upper plane 12 and lower plane 14 may be compressed and stored using a lossy compression technique such as JPEG or a lossless compression technique such as Lempel-Ziv (i.e. gzip) or CCITT-G4 while the selector plane 16 is compressed using a two-dimensional technique such as CCITT Group IV or a method of classifying scanned symbols into equivalence classes such as that described in U.S. Pat. No. 5,778,095 to Davies issued Jul. 7, 1998, the contents of which are hereby incorporated by reference.

In the preferred embodiment of the invention, any or all of these methods may be implemented in a computer any other device capable of storing a set of instructions which may be executed by a machine. The program storage device will tangibly embody this set of instructions (most often referred to as a software program) to perform the above previously recited steps for compressing a document image in the manner described in detail above with reference to the attached figures.

In summary, the present invention uses the selector plane to replace, for each plane, pixels that have been designated to be provided by the other plane by carefully chosen values. The previously existing data is completely ignored, and the newly chosen values are calculated for such that the number of bits that will be generated during the subsequent compression is minimized. While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A method of processing digital image data that is composed of multiple superimposed separations, comprising:
    a) dividing the image data into separations, wherein each separation is composed of light intensity signals in respective discrete locations, each of said light intensity signals having a value which indicates a magnitude of a light intensity of the image data in said separation at said discrete location;
    b) partitioning each separation by creating a lossless signal plane and a lossy signal plane, said partitioning including, in stated order, the steps of:
        1) selecting a number of consecutive discrete locations in said separation, said selected locations having respective light intensity values having magnitudes that lie within a pre-determined range;
        2) calculating an average value for the light intensity values; and
        3) replacing the values of signals in each of said consecutive discrete locations with said calculated average light intensity value;
    c) generating a selector map which indicates, for each discrete location in each of said separations, whether a light intensity signal previously located thereon has been placed on said lossless signal plane or on said lossy signal plane; and
    d) for at least one separation, separately compressing said lossless signal plane and said lossy signal plane in a manner suitable for compressing a type of data contained thereon, wherein said lossy signal plane is composed of a lossy subset of light intensity signals placed in discrete locations that correspond to discrete locations of lossy light intensity signals in said separation, and wherein the signals present in discrete locations on said lossless plane that correspond to discrete locations of lossless light intensity signals in said separation are ignored.

2. A method of processing digital image data as claimed in claim 1 further comprising compressing said selector map in a manner suitable for compressing a type of data contained thereon.

3. A method of processing an image as claimed in claim 1 wherein for at least one separation, said partitioning step further comprises:
    a) selecting a number of consecutive discrete locations in said separation having therein signals having equal light intensity magnitudes;
    b) designating said equal light intensity magnitude signals for said lossy subset when said selected number of consecutive locations is less than a pre-determined value; and
    c) placing signals not designated for said lossy subset in a lossless subset.

4. A method of processing an image as claimed in claim 1 wherein for at least one separation, said partitioning step further comprises:
    a) placing signals not included in said lossy subset in a lossless subset; and
    b) selecting signals that are designated for said lossy subset, said selected signals having magnitudes that are either greater than a high threshold value or less than a low threshold value, and moving said selected signals from said lossy subset to said lossless subset.

5. A method of processing an image as claimed in claim 3 wherein for at least one separation, signals are placed on said lossless signal plane in serial fashion such that they are processed in the same order that they would be if they remained in said separation.

6. A method of processing an image as claimed in claim 3 wherein, for at least one separation, the step of compressing said lossy signal plane is performed using a JPEG compression technique.

7. A method of processing an image as claimed in claim 4 wherein, for at least one separation, the step of compressing said lossless signal plane is performed using a Lempel-Ziv derivative compression method.

8. A method of processing an image as claimed in claim 2 wherein, for at least one separation, the step of compressing said selector map is performed using CCITT-G4.

9. A method of processing an image as claimed in claim 3 wherein for at least one separation, said image processing method further comprises:
    filling in empty locations in the lossy signal plane with signals that:
        a) allow for improved efficiency when compressing said lossy signal plane, or
        b) are interpolated in discrete locations corresponding to the empty locations in the lossy plane, using values of signals originally located on said separation; and
    compressing said lossy signal plane using a compression technique suitable for compressing lossy data.

10. A method of processing an image as claimed in claim 9 wherein said interpolating is performed using values that are predicted by a discrete cosine transformation-based interpolant.

11. A method of processing an images claimed in claim 9 wherein for at least one separation, said interpolating step further comprises replacing each signal with a signal that has a value equal to the average of a plurality of signals that have been designated for placement on said lossy signal plane.

12. A method of processing an image as claimed in claim 9 wherein for at least one separation, said interpolating step is performed using one or more lowest discrete cosine transform terms.

13. A method of processing an image as claimed in claim 9 wherein for at least one separation, said interpolating step is performed using a least squares approach.

14. A method of processing an image as claimed in claim 3 wherein for at least one separation, said lossless signal plane contains a number of empty spaces equal to a number of signals that have been placed in said lossy signal plane.

15. A method of processing an image as claimed in claim 14 wherein for at least one separation, said empty spaces ale filled with signals that have values that will result in improved compression efficiency.

16. A method of processing an image as claimed in claim 14 wherein for at least one separation, said empty spaces are filled with signals that have values equal to a previous neighbor in an ordinary raster-scan order sequence.

17. A method of processing an image as claimed in claim 14 wherein for at least one separation, said empty spaces are filled with signals that have values equal to a most common signal value that has previously been processed.

18. An apparatus for processing digital image data that is composed of multiple superimposed separations, comprising:
   a) means for dividing the image data into separations, wherein each separation is composed of light intensity signals in respective discrete locations, each of said light intensity signals having a value which indicates a magnitude of a light intensity of the image data in said separation at said discrete location;
   b) means for partitioning each separation by creating a lossless signal plane and a lossy signal plane, said partitioning including means for:
      1) selecting a number of consecutive discrete locations in said separation, said selected locations having respective signals, and said signals having respective light intensity values, said values having respective magnitudes that lie within a pre-determined range;
      2) calculating an average value for said selected light intensity values in the selected locations; and
      3) replacing the values of the signals in each of said consecutive discrete locations with said calculated average light intensity value;
   c) means for generating a selector map which indicates, for each discrete location in each of said separations, whether a light intensity signal previously located thereon has been placed on said lossless signal plane or on said lossy signal plane; and
   d) for at least one separation, means for separately compressing said lossless signal plane and said lossy signal plane in a manner suitable for compressing a type of data contained thereon, wherein said lossy signal plane is composed of a lossy subset of light intensity signals placed in discrete locations that correspond to discrete locations of lossy light intensity signals in said separation, and wherein the signals present in discrete locations on said lossless plane that correspond to discrete locations of lossless light intensity signals in said separation are ignored.

19. A method of processing digital image data as claimed in claim 18 further comprising means for compressing said selector map in a manner suitable for compressing a type of data contained thereon.

20. An apparatus for processing an image as claimed in claim 18 wherein for at least one separation, said partitioning means further comprises:
   means for placing signals not included in said lossy signal plane in said lossless signal plane; and
   means for selecting signals designated for said lossy signal plane that have magnitudes that are either greater than a high threshold value or less than a low threshold value, and means for moving said selected signals from said lossy signal plane to said lossless signal plane.

21. An apparatus for processing an image as claimed in claim 18 further comprising, for at least one separation means for placing signals on said lossless signal plane in serial fashion such that they are processed in the same order that they would be if they remained in said separation.

22. An apparatus for processing digital image data that is composed of multiple superimposed separations, comprising:
   a) a divider which divides the image data into separations, wherein each separation is composed of light intensity signals in respective discrete locations, each of said light intensity signals having a respective light intensity value which indicates a magnitude of a light intensity of the image data in said separation at said discrete location;
   b) a partitioner which partitions each separation by creating a lossless signal plane and a lossy signal plane, said partitioner further comprising:
      1) a run length counter which counts a number of consecutive discrete locations in said separation for which said signals have equal light intensity magnitudes; and
      2) a designator which places said signals in said lossy signal plane when said counted number of consecutive discrete locations is less than a pre-determined value, and places signals not designated for said lossy signal plane in said lossless signal plane;
   c) a selector map generator which generates a selector map that indicates for each discrete location in each of said separations, whether light intensity signals previously located thereon have been placed on said lossless signal plane or on said lossy signal plane; and
   d) for at least one separation, a plurality of data compressors which separately compress said lossless signal plane and said lossy signal plane in a manner suitable for compressing a type of data contained thereon, said lossy signal plane is composed of a lossy subset of light intensity signals placed in discrete locations that correspond to discrete locations of lossy light intensity signals in said separation, and wherein the signals present in discrete locations on said lossless plane, that correspond to discrete locations of lossless light intensity signals in said separation, are ignored.

23. An apparatus for processing an image as claimed in claim 22 wherein said partitioner further comprises a contrast controller which selects signals that have magnitudes in said lossy signal plane that are either greater than a high threshold value or less than a low threshold value, and moves said selected signals from said lossy signal plane to said lossless signal plane.

24. An apparatus for processing an image as claimed in claim 22 wherein signals are placed on said lossless signal plane in serial fashion such that they are processed in the same order that they would be if they remained in said separation.

25. A programmable storage device readable by a machine, tangibly embodying a program of instructions having method steps, the method steps comprising:
   a) dividing the image data into separations, wherein each separation is composed of light intensity signals in respective discrete locations, each of said light intensity signals having a value which indicates a magnitude of a light intensity of the image data in said separation at said discrete location;
   b) partitioning each separation by creating a lossless signal plane and a lossy signal plane, said partitioning including, in stated order, the steps of:
      1) selecting a number of consecutive discrete locations in said separation, said selected locations having respective signals, and said signals having respective light intensity magnitudes that lie within a pre-determined range;
      2) calculating an average value for the light intensity values; and
      3) replacing the values of signals in each of said consecutive discrete locations with said calculated average light intensity value;

c) generating a selector map which indicates, for each discrete location in each of said separations, whether a light intensity signal previously located thereon has been placed on said lossless signal plane or on said lossy signal plane; and d) for at least one separation, separately compressing said lossless signal planes and said lossy signal planes in a manner suitable for compressing a type of data contained thereon, wherein said lossy signal plane is composed of a lossy subset of light intensity signals placed in discrete locations that correspond to discrete locations of lossy light intensity signals in said separation, and wherein signals present in discrete locations on said lossless plane, that correspond to discrete locations of lossless light intensity signals in said separation, are ignored.

* * * * *